`2,941,958`

USE OF COLLOIDAL SILICA IN CATALYST MANUFACTURE

James E. Connor, Jr., Drexel Hill, and Clifford S. Shipley, Aldan, Pa., assignors to The Atlantic Refining Company, Philadelphia, Pa., a corporation of Pennsylvania No Drawing. Filed Feb. 4, 1957, Ser. No. 637,868

5 Claims. (Cl. 252—449)

This invention relates to a method of preparing catalysts employing colloidal solutions of silica, in particular colloidal solutions of silica in an aqueous medium. More particularly, this invention relates to a process for utilizing colloidal solutions of silica as a shaping or binding aid in the production of catalyst masses.

In recent years various organic reactions, particularly hydrocarbon reactions, in the petroleum refining industry have been placed on a commercial basis through the use of solid catalysts. In many of these processes it is desirable to use the solid catalysts in the form of pellets or similar shapes. These pellets are generally prepared by compressing discrete, finely divided particles of the catalysts into the final shape by the use of pelleting machines bearing a marked similarity to the machines which have been used for many years by pharmaceutical industries to prepare drug tablets.

During the early stages of the technology relating to the use of solid catalysts the catalysts were rather simple and contained at the most only two or three components, generally metallic oxides, one of which was usually an adsorptive material and the others the active or co-acting catalytic components. Such materials could be pelleted rather readily simply by admixing an organic binder with the finely divided catalyst particles and after pelleting the organic binder was removed by calcination at temperatures of the order of 1200° F. As the technology of solid catalysts became more complex, however, either more and more components were added to such catalysts with the result it became considerably more difficult to pellet them or components were added which for various reasons, some known and some unknown, were difficult to pellet. Moreover, components were added which lost a considerable portion of their activity by the high temperatures required to "burn out" the conventional organic or carbonaceous binders. In addition to these difficulties it was found that as the complexity of the catalysts increased the mechanical strengths of the pellets which could be produced therefrom decreased and consequently the useful life of the catalyst was severely limited simply by virtue of the fact that their mechanical strengths in pelleted form were so low that they were either crushed in the catalyst bed or attrited into powder by the motion imparted to them by the passage of gases and vapors therethrough.

Accordingly a need arose for a binder or pelleting aid which could be used to produce catalyst pellets having superior hardness and crushing resistance and which could be used with catalytic components difficult to pellet and sensitive to high temperatures.

It has now been found that certain colloidal solutions of silica meet these requirements as a binding or pelleting aid for a large variety of catalyst components. When one or more of such components are treated with colloidal solutions of silica and are compressed into pellets, the finished product has superior hardness and crushing resistance. Since relatively small amounts of such colloidal solutions are required and since the inert or carrier portion of the catalyst is often a siliceous material the additional silica has little or no effect on the activity of the catalyst. Thus the only treatment needed is one of mere drying at relatively low temperatures prior to pelleting.

It is an object of this invention to provide a process of forming relatively larger solid catalyst masses having superior hardness and crushing resistance from relatively smaller solid catalyst masses by the use of colloidal solutions of silica.

It is a further object of this invention to provide a process of employing colloidal solutions of silica to aid in forming relatively larger solid catalyst masses having superior hardness and crushing resistance from relatively smaller catalyst masses which are difficult to form into larger masses and which are sensitive to elevated temperatures.

Further objects of this invention will be apparent from the more detailed description and the appended claims which follow.

According to the invention a colloidal solution of silica is admixed with one or more of the solid components of a catalyst, all of which are preferably in the form of relatively small particles or masses. After admixing the colloidal solution with the component or components, the admixture is dried at regular oven temperatures, i.e. from 210° F. to 270° F., in order to remove the excess moisture since pelleting is most efficient with powders whose moisture content is below 10 percent by weight and preferably below about 5 percent. During the drying period there may be some slight agglomeration of the finely divided particles, however, these are of a very friable nature and very easily reduced to the powder simply by forcing the material through a screen. Following the drying period the additional catalyst components are admixed with the colloidal silica-treated catalyst components, if there are such other additional components, and then the entire mixture is pelleted in conventional pelleting machines.

It has been found that the amount of colloidal solution of silica may range from amounts merely sufficient to bring the finely divided catalyst component to a stage of incipient wetting to amounts which will form rather thick, pasty slurries. With a large number of metallic oxide type catalyst components this amount of solution will range between about 0.25 ml. per gram of powder to about 1.50 ml. per gram. Higher amounts may be used but are not necessary from a technical standpoint, and are not preferred since they would require longer drying times to remove the excess water.

The concentration of silica in the colloidal silica solution should range between about 1 percent and about 5 percent by weight. When the concentration is appreciably below about 1 percent there is not enough silica present to give a good binding action with many components which are difficult to pellet. Concentrations above about 4 percent to 5 percent are undesirable for reasons to be discussed and for the reason that the solutions are rather unstable and tend to produce a rather viscous mixture which is difficult to handle with the result that certain portions of the finely divided component will receive large amounts of silica deposited thereon, while other portions of the component will not receive a sufficient amount of silica to be useful in pelleting.

Experiments have shown that the final catalyst mixture should contain at least about 1 percent by weight of colloidal silica in order that the finished pellets will have the desired hardness and crushing resistance. With most powdered catalyst components the amount of colloidal silica which may be advantageously employed as a pelleting aid ranges between about 1 percent and 6 to 7 percent by weight. In certain cases amounts below 1 percent may give sufficient improvement in pelleting to be useful, while in other cases amounts in excess of the upper preferred limit of 6 to 7 percent may be used, although in most instances excessive amounts cause the admixture to become thick and pasty thus preventing thorough and uniform admixing of the components.

Colloidal solutions of silica are available commercially. These materials, however, are usually in rather concentrated form and are generally stabilized with small quantities of an alkali metal ion such as the sodium ion. Thus, although these solutions might be diluted with water to produce the aforementioned desired concentrations, the metallic impurities used as stabilizers might deleteriously affect the final catalyst. Accordingly it is preferred to use colloidal silica which does not contain such ionic impurities. The classical method of making such colloidal solutions of silica involves adding sodium silicate to a dilute hydrochloric acid solution, the acid being in large excess. The colloidal solution of silica thus formed is purified by dialyzing the sodium and chloride ions through a semi-permeable membrane. This method which produces colloidal solutions of extremely high purity is of course quite time consuming and therefore expensive and not too well suited for large scale plant use.

There has been described a commercially more feasible method involving diluting commercial water glass, i.e. an aqueous solution of sodium silicate of 28 percent to 30 percent concentration, expressed as $SiO_2$, with about 9 volumes of demineralized water and passing the resulting diluted solution over a cation exchange resin or zeolite which is in the acid cycle. This treatment will remove the sodium ions and thus produce high purity colloidal solutions of silica. Certain colloidal solutions of silica made by this process have been found to be particularly suitable for the purposes of the instant invention. The particular solutions found to be effective for producing pellets of the desired strength are those in which the size of the colloidal silica particle is quite small, i.e. from about 10 to about 100 Angstrom units in average diameter. The method of producing colloidal solutions in which the particle size of the silica is within this range will be shown in detail hereinafter.

In order to show the utility of the invention, standard pellets were made of various mixtures of catalysts and compared with pellets made from the same mixture of components which had been treated with colloidal silica. The quality of the pellets produced was determined by measuring the force required to crush a pellet. Standard size pellets were formed in a Stokes tableting machine, single punch type, Model E, manufactured by the Stokes Machine Company, Philadelphia, Pa. These pellets were in the form of cylinders 3/16" in diameter and averaging approximately 3/32" in height. In order to test the compression strength of a pellet, the pellet was placed between the jaws of a compression machine so that the force was applied to the round surface of the pellet and thus in a direction perpendicular to the longitudinal axis of the cylinder. The total force in pounds required to crush or shatter the pellet was then measured. In order to eliminate statistical differences among the pellets produced from a given mixture, ten pellets were selected at random from a sample of 200 to 300 pellets. The crushing strength of each of the pellets was measured and the arithmetical average taken as the crushing strength of the pellets.

A mixture of 50 percent by weight Alcoa F-10 grade activated alumina in the form of a powder which would pass through a 200 mesh U.S. Standard Sieve and 50 percent by weight modified silica-alumina cracking catalyst ground to pass through a 200 mesh U.S. Standard Sieve was chosen for test purposes, since this mixture cannot be pelleted to give hard pills of high crushing resistance without the use of a pelleting aid. The modified silica-alumina was prepared from standard commercially available cracking catalyst containing from 12 to 13 percent alumina which had been treated with steam at a pressure of approximately 150 p.s.i. and a temperature of 1050° F. for a time sufficient to reduce its cracking activity to approximately one-half its original activity. The alumina portion of this mixture ordinarily is used as a support for a metal hydrogenation catalyst when the metal hydrogenation catalyst is deposited on the alumina and this component is admixed with the modified silica-alumina, the resulting mixture cannot be pelleted without a pelleting aid.

If conventional pelleting aids are utilized, such as polyvinyl alcohol and Sterotex (hydrogenated peanut oil), Emery Industries, Cincinnati, Ohio, it is necessary to burn them out at temperatures of about 1200° F. It has been found that this temperature has a deleterious effect on the hydrogenation component of the catalyst, consequently, the use of a catalyst of 50 percent alumina and 50 percent modified silica alumina furnishes an ideal test case for the use of colloidal silica as a pelleting aid.

The following examples are included to illustrate various aspects and details of the invention.

EXAMPLE I

Several colloidal solutions of silica were prepared and admixed with the above described catalyst component mixture. In general, the methods for preparing the colloidal solutions involved diluting a sample of commercial water glass (specific gravity 1.38, 28 percent by weight $SiO_2$) with a known volume of demineralized water. The diluted solutions were passed over a cation exchange resin bed (Amberlite IR-120, a high capacity sulfonic acid type cation exchange resin produced by the Rohm and Haas Co., Philadelphia, Pa.). This ion exchange treatment removed all but a trace of sodium ions thus producing a high purity colloidal silica solution for treating the 50 percent alumina-50 percent modified silica alumina mixture described above. In some instances the colloidal silica effluent from the ion exchange bed was diluted with an additional known volume of demineralized water prior to treating the catalyst component mixture.

After the various colloidal silica solutions were prepared they were admixed with the catalyst components at the rate of 125 ml. of solution per 100 grams of catalyst. The treated catalyst components were dried at about 212° F. for about 16 hours to produce powders having between 4 percent and 5 percent by weight moisture content.

The dried, treated catalyst components made from each colloidal solution were pelleted in the above described Stokes machine and each group divided into two portions. The crushing strength of the pellets of the first portion was determined as described above. The second portion was calcined with air at a temperature of 950° F. since this treatment is normally accorded to catalysts wherein the alumina portion has had a metal hydrogenation catalyst compound deposited thereon which requires such treatment to convert the metal compound to the metal. A typical example of such a catalyst is alumina treated with chloroplatinic acid which after admixture with another metal oxide component and pelleting is calcined to produce metallic platinum. Such a catalyst cannot be subjected to temperatures in excess of 975° F. to 1000° F. without deleterious effects to its catalytic functions. The force required to crush these calcined pellets was also measured. In general the calcined pellets exhibited a somewhat higher crushing strength than the uncalcined pellets.

The results of these tests are set forth in Table I.

Table 1

| Test Number | Dilution of Water Glass Prior to Ion Exchange, Vol. Water Glass to Vol. of water | Dilution of Effluent from Ion Exchange, Vol. of Effluent to Vol. of Water | Concentration of Silica Used for Treating, Grams/ml. | Pellet Strength | |
|---|---|---|---|---|---|
| | | | | Pounds Required Not Calcined | Pounds Required Calcined |
| 1 | 1:1 | 1:1 | 0.096 | 2.8 | 4.9 |
| 2 | 1:1 | 1:4 | 0.0386 | 2.2 | 5.5 |
| 3 | 1:4 | ¹1:1 | 0.0386 | 10.0 | 15.0 |
| 4 | 1:9 | None | 0.0386 | 22.0 | 23.0 |
| 5 | Blank, no treatment with colloidal silica | | 0 | 2.0 | 3.0 |

¹ Only the silica alumina portion of the catalyst mixture treated.

These data (test No. 5) show the necessity of treating the mixture of catalyst components with a pelleting aid in order to produce pellets having a substantial crushing resistance. If test Nos. 1, 2 and 3 are compared with test No. 4 another important fact will be noted, namely, that the colloidal silica solution must be prepared by ion exchanging one volume of an aqueous sodium silicate solution diluted with about nine volumes of water, the dilution being made before the exchange step. If more concentrated solutions are ion exchanged, test Nos. 2 and 3, and then diluted to the same concentration, inferior pellets are obtained. In order to learn the causes of this surprising fact the particle size of the silica used for treating in test No. 2 and that of test No. 4 was determined by electron microscope measurements. In test No. 2 where a 1:1 dilution of sodium silicate was exchanged and the colloidal solution diluted to the desired silica concentration, the silica particles had an average diameter of about 500 Angstrom units. The silica particles prepared for test No. 4 had an average diameter of about 10 to 15 Angstrom units. Additional tests with other colloidal silica solutions showed that those in which the average diameter of the silica particles as originally prepared exceeded about 100 Angstrom units were not suitable for preparing pellets having the desired hardness and crushing resistance.

EXAMPLE II

In order to determine the effective concentrations of silica a sample of the same colloidal solution of silica used for test No. 4 of Example I was diluted with known volumes of demineralized water prior to treatment of the same mixture of catalyst components used in Example I. The amount of solution used was the same as in Example I, namely, 125 ml. of silica solution per 100 grams of catalyst component. The results of these tests are contained in Table II.

Table II

| Test No. | Dilution of Water Glass Prior to Ion Exchange, Vol. of Water Glass to Vol. of Water | Dilution of Effluent From the Ion Exchange, Vol. of Effluent to Vol. of Water | Concentration of Silica Used for Treating, Grams/ml. | Percent Silica on Catalyst Components | Pellet Strength | |
|---|---|---|---|---|---|---|
| | | | | | Pounds Required Not Calcined | Pounds Required Calcined |
| 6 | 1:9 | None | 0.0386 | 4.8 | 22.0 | 23.0 |
| 7 | 1:9 | 1:1 | 0.0193 | 2.4 | 17.5 | 20.5 |
| 8 | 1:9 | 1:3 | 0.0096 | 1.2 | 20.0 | 18.5 |

These data show that as the concentration of silica decreases and thus as the amount of silica deposited on the catalyst components decreases, the pellet strength also decreases. Accordingly, silica concentrations in the treating solution much below about 1 percent and corresponding concentrations on the catalyst components below about 1 percent are not desired.

While the utility of the process of the instant invention has been shown with a mixture of catalyst components which are known to be extremely difficult to pellet, it of course is equally applicable to catalysts containing silica, magnesia, thoria, zirconia, alumina, boria, molybdena, chromia, and similar metal oxides either alone or in their various known admixtures and combinations. Likewise, such metal oxides may form the sole active catalyst component or they may be either the carrier or co-acting component for catalysts containing various metals such as tungsten, iron, cobalt, nickel, platinum, palladium and similar active metals or compounds of such metals including complex compounds with each other such as molybdates, tungstates and the like. The method is also applicable to naturally occurring catalytic materials and combinations of such materials with treated or synthetic materials. It is also applicable to materials combined with radicals of the non-metallic elements such as phosphates, sulfates, sulfides and the like.

We claim:

1. A process for forming relatively larger solid inorganic oxide catalyst masses having superior hardness and crushing resistance from relatively smaller solid inorganic oxide catalyst masses which comprises treating said smaller solid inorganic oxide catalyst masses with a colloidal solution of silica free of ionic impurities ranging in amount from an amount sufficient to bring the smaller solid inorganic oxide catalyst masses to a stage of incipient wetting to an amount sufficient to form a thick, pasty slurry, the concentration of silica in the colloidal solution of silica ranging between about one percent and about five percent by weight, and in which colloidal solution of silica the silica particles as originally prepared range from about 10 to 100 Angstrom units in average diameter and thereafter pressing the treated masses into the relatively larger masses.

2. A process for forming relatively larger solid inorganic oxide catalyst masses having superior hardness and crushing resistance from relatively smaller solid inorganic oxide catalyst masses which comprises treating said smaller solid inorganic oxide catalyst masses with a colloidal solution of silica free of ionic impurities ranging in amount from an amount sufficient to bring the smaller solid inrganic oxide catalyst masses to a stage of incipient wetting to an amount sufficient to form a thick, pasty slurry, the concentration of silica in the colloidal solution of silica ranging between about one percent and about five percent by weight, and in which colloidal solution of silica the silica particles as originally prepared range from about 10 to 100 Angstrom units in average diameter, drying said treated smaller masses and thereafter pressing the dried, treated masses into the relatively larger masses.

3. The process of claim 2 in which the amount of colloidal solution of silica ranges between about 0.25 milliliters and about 1.50 milliliters per gram of smaller catalyst masses.

4. A process for forming relatively larger solid inorganic oxide catalyst masses having superior hardness and crushing resistance from relatively smaller solid inorganic oxide catalyst masses which comprises treating said smaller solid inorganic oxide catalyst masses with a colloidal solution of silica free of ionic impurities wherein the concentration of silica ranges between about one percent and about five percent by weight and wherein the silica particles as originally prepared range from about 10 to about 100 Angstrom units in average diameter, the amount of the colloidal solution of silica being such that the final catalyst mixture will contain at least about one percent by weight of said silica, drying the treated smaller catalyst masses and thereafter pressing the dried, treated masses into the relatively larger masses.

5. A process for forming relatively larger solid inorganic oxide catalyst masses having superior hardness and crushing resistance from a mixture of inorganic oxide catalyst components in the form of relatively smaller solid inorganic oxide masses which comprises treating at least one of said inorganic oxide catalyst component smaller masses with a colloidal solution of silica free of ionic impurities wherein the concentration of silica ranges between about one percent and about five percent by weight and wherein the silica particles as originally prepared range from about 10 to about 100 Angstrom units in average diameter, the amount of the colloidal solution of silica being such that the final catalyst mixture will contain at least about one percent by weight of said silica, drying said treated catalyst component masses, admixing said treated catalyst component masses with the other component of the catalyst and thereafter pressing the admixture into relatively larger masses.

References Cited in the file of this patent
UNITED STATES PATENTS

| | | |
|---|---|---|
| 1,970,204 | Stockton | Aug. 14, 1934 |
| 2,363,876 | Lande | Nov. 28, 1944 |
| 2,477,386 | McCarter | July 26, 1949 |
| 2,649,388 | Wills et al. | Aug. 18, 1953 |
| 2,693,456 | Fennell | Nov. 2, 1954 |
| 2,763,622 | Plank et al. | Sept. 18, 1956 |